United States Patent
Stavitskii et al.

(10) Patent No.: US 11,275,350 B2
(45) Date of Patent: Mar. 15, 2022

(54) SYSTEM AND METHOD FOR CREATING A PERSONALIZED USER ENVIRONMENT

(71) Applicant: Endel Sound GmbH, Berlin (DE)

(72) Inventors: Oleg Stavitskii, Berlin (DE); Kyrylo Bulatsev, Frankfurt (DE); Philipp Petrenko, Berlin (DE); Dmitry Bezugly, Kaliningrad (RU); Evgeny Gurzhiy, Berlin (DE); Dmitry Evgrafov, Moscow (RU)

(73) Assignee: Endel Sound GmbH, Berlin (DE)

( * ) Notice: Subject to any disclaimer, the term of this patent is extended or adjusted under 35 U.S.C. 154(b) by 121 days.

(21) Appl. No.: 16/674,844

(22) Filed: Nov. 5, 2019

(65) Prior Publication Data

US 2020/0142371 A1     May 7, 2020

Related U.S. Application Data

(60) Provisional application No. 62/755,725, filed on Nov. 5, 2018.

(51) Int. Cl.
*G05B 19/042* (2006.01)
*H04L 12/28* (2006.01)

(52) U.S. Cl.
CPC ........ *G05B 19/042* (2013.01); *H04L 12/2816* (2013.01); *G05B 2219/2614* (2013.01)

(58) Field of Classification Search
CPC .......... G05B 19/042; G05B 2219/2614; H04L 12/2816; G10H 2240/085;

(Continued)

(56) References Cited

U.S. PATENT DOCUMENTS

| 7,396,990 B2 | 7/2008 | Lu et al. |
| 7,680,906 B2 | 3/2010 | Helander |

(Continued)

FOREIGN PATENT DOCUMENTS

| JP | 2017124165 A | 7/2017 |
| RU | 2632131 C2 | 10/2017 |

(Continued)

OTHER PUBLICATIONS

International Search Report for application PCT/IB2019/001187 dated Feb. 6, 2020, 12 pages.

*Primary Examiner* — Mohammad Ali
*Assistant Examiner* — Sheela Rao
(74) *Attorney, Agent, or Firm* — Polsinelli PC

(57) ABSTRACT

A system and method of creating a personalized sounds and visuals environment to address a person's individual environment and state by receiving output from a plurality of sensors, the sensors detecting the activity of the user and the environment in which the user is active. Sounds and/or visuals to be transmitted to the user for listening and watching on the user's device are determined based on one or more of the sensor outputs, a user profile, a user mode, a user state, and a user context. The determined sounds and/or visuals are transmitted and presented to the user, and the determined sounds and/or visuals are automatically and dynamically modified in real time based on changes in the output from one or more of the plurality of sensors and/or changes in the user's profile.

20 Claims, 13 Drawing Sheets

(58) Field of Classification Search
CPC ....... G10H 2220/371; G10H 2220/355; G10H 2220/351; G10H 1/0008; G06Q 10/10
See application file for complete search history.

(56) References Cited

U.S. PATENT DOCUMENTS

| | | |
|---|---|---|
| 7,786,369 B2 | 8/2010 | Eom et al. |
| 8,259,192 B2 | 9/2012 | Nair |
| 8,644,971 B2 | 2/2014 | Weinstein |
| 9,513,867 B1 | 12/2016 | Tokunaga |
| 9,990,413 B2 | 6/2018 | Jung et al. |
| 2007/0198663 A1 | 8/2007 | Helander |
| 2009/0108082 A1 | 4/2009 | Goldman et al. |
| 2011/0125777 A1 | 5/2011 | Begeja et al. |
| 2014/0260915 A1* | 9/2014 | Okuda .................... G10H 1/38 84/613 |
| 2015/0204561 A1 | 7/2015 | Sadwick et al. |
| 2016/0151603 A1* | 6/2016 | Shouldice ................ H04R 3/00 600/28 |
| 2016/0234034 A1 | 8/2016 | Mahar et al. |
| 2017/0060519 A1 | 3/2017 | Roberdet |
| 2017/0109983 A1 | 4/2017 | Flint et al. |
| 2017/0345267 A1 | 11/2017 | Flint et al. |
| 2018/0025616 A1 | 1/2018 | Lin et al. |
| 2019/0049968 A1* | 2/2019 | Dean .................... G05D 1/0088 |
| 2020/0132330 A1 | 4/2020 | Mowery et al. |
| 2020/0132332 A1 | 4/2020 | Mowery et al. |

FOREIGN PATENT DOCUMENTS

| | | |
|---|---|---|
| WO | 2012001566 A1 | 1/2012 |
| WO | 2014/185061 A1 | 11/2014 |

* cited by examiner

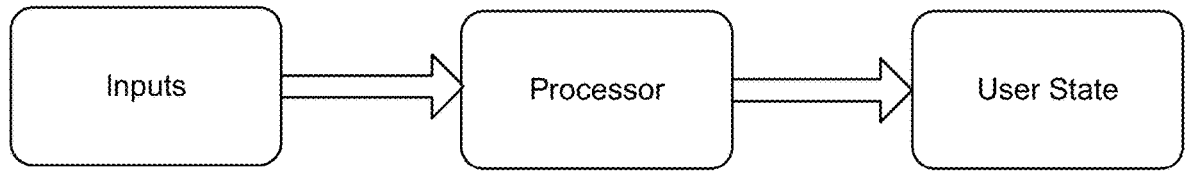

Inputs → Processor → User State

Location
Time
Heartrate
Blood Pressure
Steps
Cadence
Movement Type
Weather

Processes raw
data into
actionable user
description

User Mode:
  Relax
  Focus
  Energized
  Sleep

User State:
  Stressed
  Relaxed
  Asleep
  Need Focus
  Excitement
  Movement

User Context:
  Weather
  Time
  Date
  At Work
  Driving
  Weather
  Location

Input: Time 14:30 → Processor → Cyrcadian=Afternoon

FIG. 3

702
Sound Layers

| 704 | 706 | 708 | 710 | 712 | 714 |
|---|---|---|---|---|---|
| Layer 1 | Focus | Time | Location | — | . . . |
| Layer 2 | Relax | Time | Location | Weather | . . . |
| Layer 3 | Relax | Time | — | — | . . . |
| Layer 4 | Focus | Time | Location | — | . . . |
| Layer 5 | Sleep | Time | — | Weather | . . . |
| ... | | | | | |
| Layer N | Sleep | — | Location | Weather | . . . |

FIG. 7

SYSTEM AND METHOD FOR CREATING A PERSONALIZED USER ENVIRONMENT

CROSS-REFERENCE TO RELATED APPLICATION

This application claims the benefit of U.S. Provisional Patent Application No. 62/755,725, filed Nov. 5, 2018 and entitled "System and Method for Creating a Personalized Sound Environment," the disclosure of which is incorporated herein in its entirety by reference.

BACKGROUND

Distractions and stress are naturally introduced in day-to-day living; and, often, technological innovations intended to improve the quality of life often have a reverse effect with the difficulty, unreliability, and change brought about by the innovation. Decisions have to be made; appointments have to be made and kept; bills have to be paid; meetings have to be attended, projects have to be completed, reviewed, and revised; phone calls have to be timely made and answered; new procedures, technologies, and devices need to be implemented, and distractions have to be overcome.

People attempt to deal with these stress-causing issues in a variety of ways, including ignoring them, exercising, reading a fiction book, mediation, and eating, just to name a few. However, many of these attempts are ineffective because they cannot be utilized in the actual stressful circumstance or they are not responsive to the particular source of stress or the evolving environment of the individual. What is needed is a system for automatically and dynamically accessing information relevant to an individual's state and surroundings and present to the individual users a personalized transmission(s) of sound and/or visuals and/or a personalized control of the users' environment for focus or relaxation and preparing the individual users for their day or helping them unwind after one.

SUMMARY

Embodiments are directed to a computer implemented method for creating a personalized environment to address a person's individual environment and state, including receiving output from a plurality of sensors, the sensors detecting the state of the user and the environment in which the user is active, wherein the received sensor output provides information on at least user location, user heartrate, user movement type, and user weather; determining from the sensors' output an actionable description for the user; and determining from the determined actionable description a user mode, a user state, and a user context. The method further includes determining from a user profile whether to present sounds, visuals, or both to the user; determining sounds and/or visuals to be presented to the user based on one or more of the sensor outputs, the determined actionable user description, the determined user mode, the determined user state, and the determined user context; presenting the determined sounds and/or visuals to the user on a user device; and automatically modifying the determined sounds and/or visuals based on changes in the output from one or more of the plurality of sensors.

Additional embodiments are directed to a system for creating a personalized environment to address a person's individual environment and state, including a network sounds/visuals server; a computer readable medium; and a processor coupled to the computer readable medium. The processor is operative to receive output from a plurality of sensors, the sensors detecting the state of the user and the environment in which the user is active, wherein the received sensor output provides information on at least user location, user heartrate, user movement type, and user weather; determine from the sensors' output an actionable description for the user; and determine from the determined actionable description a user mode, a user state, and a user context. The processor is further operative to determine from a user profile whether to present sounds, visuals, or both to the user; determine sounds and/or visuals to be presented to the user based on one or more of the sensor outputs, the determined actionable user description, the determined user mode, the determined user state, and the determined user context; present the determined sounds and/or visuals to the user on a user device; and automatically modify the determined sounds and/or visuals based on changes in the output from one or more of the plurality of sensors.

Further embodiments are directed to a computer readable medium, not including a signal, having computer readable instructions stored thereon which, when executed by a processor, provide for creating a personalized environment to address a person's individual environment and state, the instructions executing on a processor of a computer, including the steps of receiving output from a plurality of sensors, the sensors detecting the state of the user and the environment in which the user is active, wherein the received sensor output provides information on at least user location, user heartrate, user movement type, and user weather; determining from the sensors' output an actionable description for the user; and determining from the determined actionable description a user mode, a user state, and a user context. Additional steps provide for determining from a user profile whether to present sounds, visuals, or both to the user; determining sounds and/or visuals to be presented to the user based on one or more of the sensor outputs, the determined actionable user description, the determined user mode, the determined user state, and the determined user context; presenting the determined sounds and/or visuals to the user on a user device; and automatically modifying the determined sounds and/or visuals based on changes in the output from one or more of the plurality of sensors.

Additional embodiments of the present application are directed to a system and method for creating a personalized environment to address a person's individual stress and/or state, including receiving output from a plurality of sensors, the sensors detecting the activity of the user and the environment in which the user is active; determining from the plurality of sensors' output an actionable description for the user; and determining from the determined actionable description a user mode, a user state, and a user context. The system and method also include determining a sound to be broadcast to the user based on one or more of the sensor outputs, the determined actionable user description, the determined user mode, the determined user state, and the determined user context; presenting the determined broadcast sound to the user; and automatically modifying the determined broadcast sound based on changes in the output from one or more of the plurality of sensors. Embodiments can also determine visuals representation to be broadcast to the user with the broadcast sound or instead of the broadcast sound, for presenting visual images and colors in motion to the user. Additional embodiments direct signals to control lights and temperature of the user's environment, based on the determined mode, state, and context of the user.

Further, embodiments provide for personalization of sounds and visuals to be presented to benefit a user, and the presentation of such personalized sounds and visuals and environmental control can be presented to the user on any device or platform at the user's location in real time. The presentation of sounds and visuals are personalized based on sensor information related to the user and based on user profile and preference information.

Current embodiments improve over prior mood creating and altering techniques by selecting individual notes, sounds, colors, images, and animations for automatic and dynamic presentation to the user with no user input at the time that changes to the user are needed or requested. No actual music or sound tracks are needed, nor any playlist designated by the user or offered by a system for the user to select is needed. Further, the system dynamically responds to changes in received sensor input to modify the sounds, visuals, and/or environment being made available to the user for positively affecting the mode, state, and context of the user.

BRIEF DESCRIPTION OF THE DRAWINGS

The present invention has other features and advantages which will be apparent from or are set forth in more detail in the accompanying drawings, which are incorporated herein, and the following Detailed Description, which together serve to explain certain principles of the present invention and to enable a person of ordinary skill in the art to make and use the embodiments disclosed herein. In the drawings, like reference numbers indicate identical or functionally similar elements.

FIG. 3 is a flow diagram showing sensor inputs to a processor for processing raw input data for determining an actionable user description representative of a user's state.

FIG. 7 shows a chart of a sound layers for presentation to a user based on user mode and sensory and environmental inputs.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes can be determined in part by persons of ordinary skill in the art for the particular intended application and use environments.

DETAILED DESCRIPTION

Figure 1:
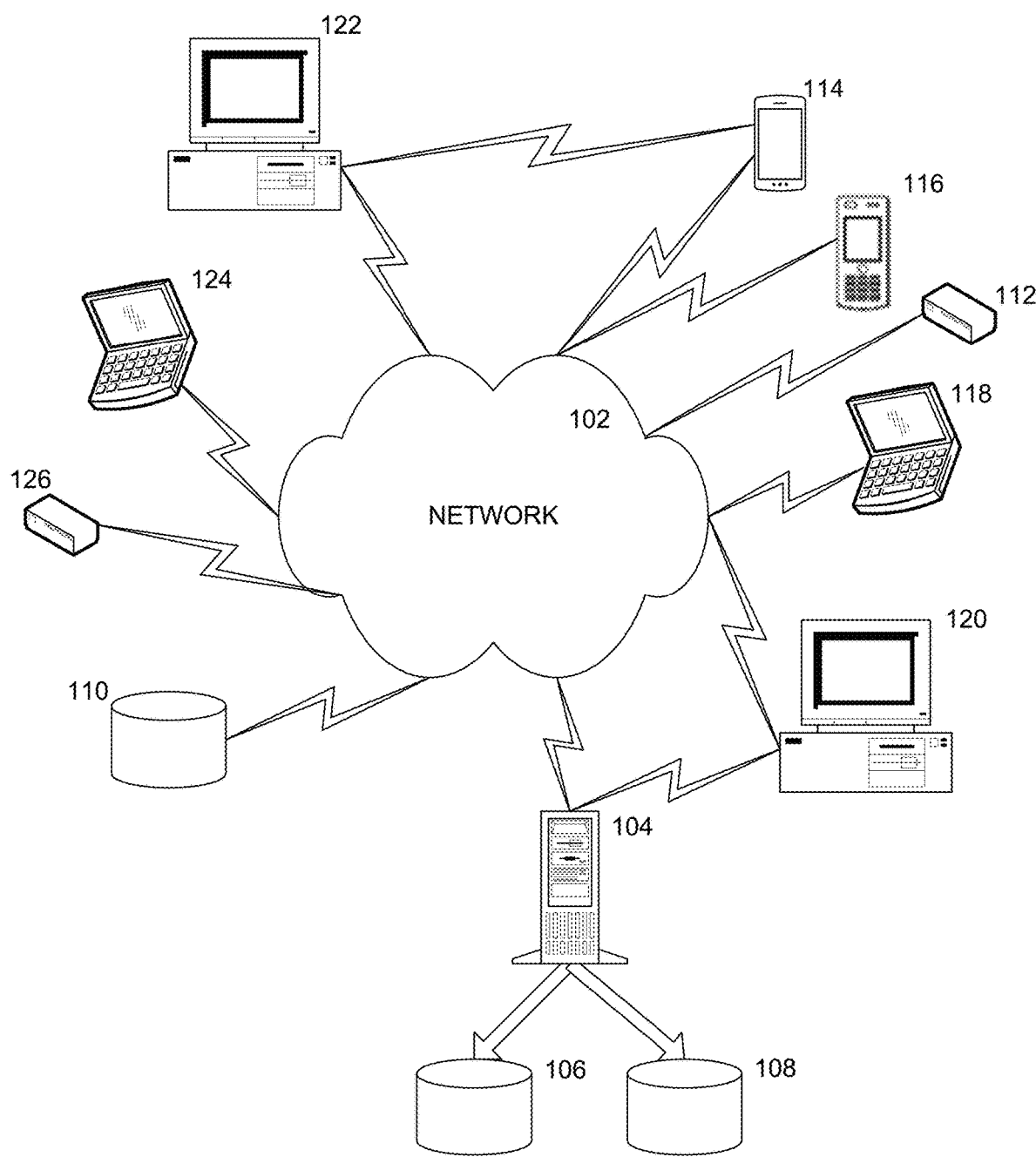
FIG. 1 illustrates an example architecture of a network for implementing a method for creating a personalized sound, video, lighting, and temperature environment for a user.

Although the described embodiments can be implemented in any appropriate type of network system supporting any suitable data transmission and presentation standards and using any suitable components, particular embodiments can be implemented in an exemplary network such as shown in FIG. 1. Alternately, embodiments can be performed on a user device 114 upon receipt of sensor outputs and user inputs for presentation of sounds and visuals to the user and control of the lighting and temperature of the user's environment.

Referring first to FIG. 1, there is shown an exemplary architecture of a network and system for implementing a method for creating a personalized sound, visual, lighting, and temperature environment for a user. The network 102 across which transmissions of information, data, sound, visual images, and control signals in exemplary embodiments occur, can include any private or public, wired or wireless network, including but not limited to Local Area Networks, Wide Area Networks, the Internet, the World Wide Web, radio frequency (RF), Bluetooth, and a Cloud-based network. There is shown an exemplary network sounds/visuals server 104 and one or more databases and/or storage devices 106, 108, and 110. There may be more servers, more databases, and more storage devices 110 than those displayed in FIG. 1, with the servers minimally configured with memory, storage media, at least one processor, communication resources, and with databases and files being external to or integrated with the servers. There are one or more user devices 114-120, platforms, or channels, for utilizing the personalized sounds/visuals system and for the presentation of personalized sounds and/or visuals to individual users. For convenience and not limitation, users are collectively represented as a smart phone 114. The system 100 can effect the analysis of sensor data, environmental information, user input, and library sounds and visuals; and transmission of personalized sounds and/or visuals to users of devices 114 through the network sounds/visuals server 104 and network 102. Additionally, the system 100 can effect control of the user's environment by receiving lighting and temperature sensors output and sending signals to lights and a heating device or an air conditioner proximate to the user for controlling the lighting and temperature in the user's environment for positively affecting the user's mode, state, and/or context. The system can determine whether the lighting and the temperature should be increased or lowered based on at least the received sensor outputs and can generate and transmit control signals to the devices 126 controlling the lighting and the temperature at the user's location. Alternately, such lighting and temperature changes can first be presented to the user for acknowledgement and/or approval before transmitting the control signals to the devices to be controlled. The control signals can be transmitted by such communications as Bluetooth or wifi. The personalized sounds/visuals system 100 extends to software, programs, and routines within storage media on each of the user devices and network server.

The user devices 114 for receiving, playing, and displaying the personalized sounds and/or visuals are representatively shown as a smart phone 114, a cell phone 116, a portable tablet or laptop computer 118, and a desktop computer 120. Examples of user devices 114 include, but are not limited to, wireless user equipment and communication devices, such as, for example, mobile telephones, smart phones, personal digital assistants, electronic readers, portable electronic tablets, personal computers, and laptop computers. Each representative user device 114 minimally comprises a processor, a memory coupled to the processor, computer readable media, facilities for entering information into the user device 114, and an antenna or other wired or wireless connection device coupled to the processor for receiving and transmitting information, messages, commands or instructions, sounds and/or visuals. A display on the user device 114 can include touch screen technology for the entry of user information required by the system and information related to the environment, including location, of the user. The information can be entered, for example and not limitation, in text form or by touching action buttons displayed on the screen or integrated with the body of the user device 114. Alternately, user entry of information can be through use of a physical or touch screen keyboard or by voice.

Output and readings from a plurality of sensor devices 112 are received by the sounds/visuals system 100, and particularly by the network sounds/visuals server 104. The information and data received from the sensor devices 112 include information related to the user and the environment in which the user is situated. This sensor data is utilized to assist with selection of sounds and visuals to present to the user and for determining lighting and temperature changes, as discussed in more detail below.

The sounds/visuals system 100 alternately includes one or more receiver devices 122 and 124 for receiving information and commands from the user devices 114. These receiver devices are collectively represented as a computer 122. The receiver devices 122 can be any type of computing device having communications and display facilities in the same manner of the user devices 114. One to many receiver devices 122 are in communication with the system 100 and can communicate from a plurality of different devices and via a plurality of different communication protocols, as described above regarding the remote user device 114. While FIG. 1 shows all communications being directed to the network sounds/visuals server 104, exemplary embodiments are not so limited; and communications can be provided directly through the network 102 between the user devices 114 and the receiver devices 122 for receiving information from the user devices 114 and presenting sounds/visuals to the user devices 114.

Exemplary embodiments are implemented on the network sounds/visuals server 104 and on the computers of the user devices 114 and, alternately on the receiver devices 122. Computer readable and executable instructions, or software, are provided for directing the processing of the computers of the exemplary devices 114, 122, and 104, including processing the steps of exemplary embodiments of the sounds/visuals system 100. The computer executable instructions, when executed by the computers 114, 122, and 104 and/or the processors associated with each of said computers, provide for the presentation of personalized sounds and/or visuals to the user devices 114 and the control of the user's environment.

One or more storage devices 106, 108, and 110 are provided for storage of information regarding resources available for composing sounds and visuals to be presented to the user devices 114. This information includes, but is not limited to, user profiles, note sequence files, raw audio files, files of single note sounds, sound tones, sounds from musical instruments, visual images, and visual images in various shapes, colors, and animations. The stored information can also include past sounds and visuals presented to the user and past control information transmitted to control the lighting and temperature in the user's environment. The storage devices can retain data and information as files, libraries, and directories, for example. Access to and usage this information to compose sounds and visuals to be presented to the user is discussed in more detail below.

Computer readable media includes computer storage media, which includes volatile and non-volatile media, removable and non-removable media implemented in any method or technology for the storage of information, including computer readable instructions, data structures, display templates, and responder information. Computer storage media includes, but is not limited to magnetic media (e.g., a hard disk), non-transitory memory, optical media (e.g., a DVD), memory devices (e.g., random access memory), and the like. In some embodiments, computer readable instructions are configured such that, when executed by a processor, the instructions causes the processors of the exemplary computers 114, 122, and 104 to perform steps described below of the sounds/visuals system (e.g., steps described below with reference to the flow chart shown in FIG. 2). In other embodiments, the exemplary computers 114, 122, and 104 are configured to perform steps described below without the need for instructions. Therefore, the features of the present embodiments described herein may be implemented in any suitable combination of hardware and/or software. Computer storage media does not include a carrier wave or any other propagated data signal.

Embodiments of the disclosed system and method create a personalized sounds, visuals, lighting, and/or temperature environment to help a user relax and focus. Relax mode is designed to provide soothing sounds/visuals to calm a user's mind and induce a feeling of comfort and safety. Focus mode will help the user speed up productivity and assist with longer concentration. On the Go, or energizing, mode enhances the user's walks and runs by adapting to the personal speed of the user. Sleep mode generates personalized white noise to put the user into a deep sleep.

In one embodiment, the methodology for generating personalized sound environments for users is based on circadian rhythms, pentatonic scale, and sound masking. The generated sounds, visuals, and control signals automatically adapt, without any user input, to different inputs, such as time of day, weather, heart rate, and location. The process begins with the user opening an application on the user's device. The user's device is preferably a portable device connected to a network such as the Internet. However, the disclosed system and method will perform well on a user device that is not connected to a network or on a user device that is not portable, with local storage files, media, and software.

Figure 2:
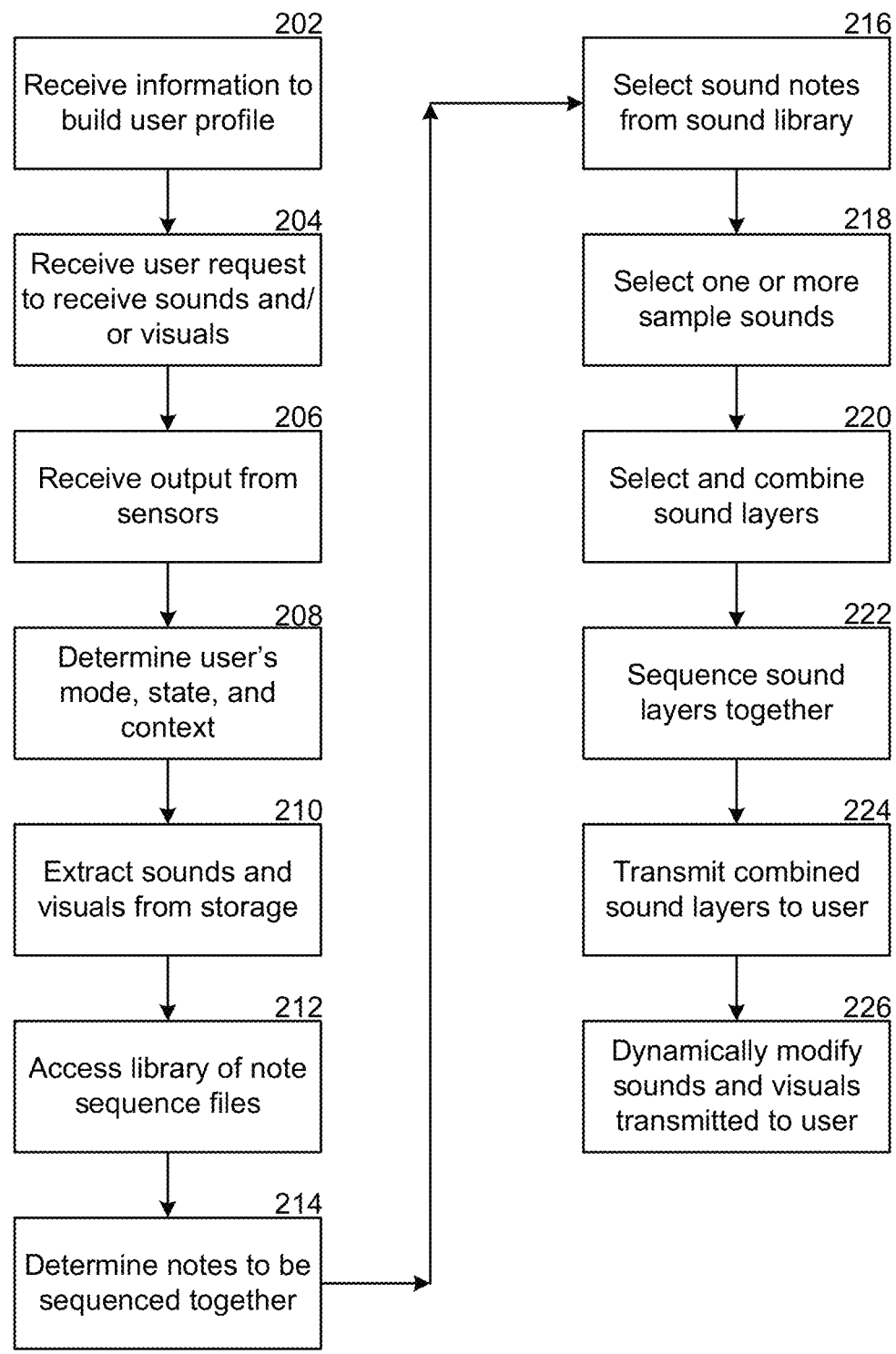
FIG. 2 is a flowchart illustrating the steps for creating a personalized sound, video, lighting, and temperature environment for a user.

Referring now to FIG. 2, there is shown a flowchart of a method for composing and presenting personalized sounds and visuals to a user and for controlling the user's environment, based on that user's environment and state. The present invention provides a method for creating a personalized environment to address a person's individual environment, mode or needed mode, state, and context, including receiving and analyzing sensor data representative of a user's environment and state and utilizing the analyzed data with libraries of sounds and visuals to compose and present to the user a dynamic, personalized stream of sounds and/or visuals. The sounds to be presented to the user are comprised of a created composition of notes, sounds, and instrument sounds in multiple combinations and layers. This sounds presentation is in contrast to presenting known music scores or a music playlist for user selection and/or listening. Correspondingly, the visuals to be presented to the user are comprised of a creation of colors, random shapes, images, and the animations and flows of such colors, shapes and images. In some embodiments, the visuals created for presentation to the user can be similar to the images seen in a rotating kaleidoscope Hereinafter, the steps of this method will be described in detail.

At step 202, the application presents a number of questions and categories to the user to establish a user profile, the profile may include user preferences, such as related to music, genre, sound, activities, vocation, avocations, images, colors, and weather. The system builds a profile of the user based on the received user information in response to the questions and selected categories. The user can change the profile at will upon identified authorization.

At step 204, a request is received from the user to receive sounds and/or visuals from the system, based on the user's environment and state. The request can indicate whether sounds, visuals, or both are requested. The request can also indicate particular user-related environmental or state information, such as the user requesting sounds/visuals for a certain period of time and/or the user expressly requesting sounds/visuals to provide relax, focus, or On the Go (or energizing) modes for the user. Alternately, the user's profile can provide this information. Also, the user can establish a profile that instructs the system to automatically initiate presentation of sounds/visuals at a particular time of day or day of the week, or upon determining a particular state of the user, such as a high heartrate or blood pressure, or prolonged driving.

At step 206, and referring also to FIGS. 3, 5, 8, and 9, the application receives the outputs from sensors 112 and from the user; and from those outputs can determine an actionable description for the user. Such an actionable description includes a user mode, a user state, a user context, and a user physical environment. Based on the user's determined actionable description, the system can determine the user's status and can determine sounds, visuals, lighting changes, and temperature changes to positively impact the user. The sensors 112 can provide location information, such as from a global positioning receiver (GPS) on the user's device 114. The received GPS information can be continual such that the system can determine whether the user is stationary, walking, running, or driving. With this information, the system can partially determine the sounds/visuals to present to the user and/or how to change the lighting and temperature for the user. For example, a stationary state of the user suggests the user may be at work; and the system selects focus-related sounds/visuals for presentation. Similarly, if the user is determined to be walking or running, energizing (i.e., upbeat) sounds/visuals can be selected for presentation. Alternately, the user may have established a profile indicating that relaxing sounds/visuals are preferred for walking. If the user is determined to be driving, based on the speed and the path whereby the GPS signals are changing and by traffic information input, a combination of relaxing and focusing sounds/music can be selected for presentation. Also, the system can send control signals to affect the lighting and temperature of the user's environment while driving. Further, the location information can determine to which channel or platform to transmit the sounds/visuals to the user, such as the user's work computer, the user's portable phone, or the user's home computer. The system is adaptable to provide a personalized sounds, visuals, and/or control signals delivery to a user over a network or a cloud-based service regardless of where the user is located or moving toward. Parameters can be established to weight the relative importance and impact of the outputs from the sensors based on the user profile and preferences, perhaps, for example, giving more significance to heartrate and blood pressure for an older user.

The sensors 112 can also provide the physical information, such as the heartrate and/or the blood pressure, of the user. The heartrate information, coupled with other sensor data, helps the system determine the user's state and the user's changing state (such as when the heartrate increases or decreases). The system can compare the user's heartrate against a medical standard for persons of the user's profile, such as age, weight, and exercise regiment, or from an accumulated history of the user's heartrate. This comparison can suggest the user is more or less stressed, is engaged in more or less strenuous activity, is more or less relaxed; and the system can dynamically adjust the sounds/visuals presented to the user and lighting/temperature controls to provide an environment to relax the user, cause the user to better focus, to help energize the user, and to help the user fall asleep. Similarly, the user's blood pressure, if elevated compared to a standard or the user's history, can signal a stressful condition for which soothing or relaxed sounds/visuals should be presented.

Other sensors 112 provide weather data, knowing that high winds, excess temperatures (high or low), bright or diminished light, and rapidly changing barometric pressure can affect an individual's mood and stress level. In recognition of the environment in which the user is functioning, the system can provide sounds/visuals, lighting controls, and/or temperature controls to counter the user's environmental effect, such as providing energizing sounds/visuals and/or transmitting control signals to increase lighting in response to low light, or sensing the user is indoors based on sensing indoor lighting or GPS signals and sending control signals to adjust the temperature.

Further sensors 112 provide data regarding the user's steps, cadence, and movement type. Such information helps determine what the user is doing, in addition to the more global GPS data. This information can help specifically determine whether the user is walking in a relaxed manner, rushing to get to an appointment on time, climbing stairs, sitting at a desk, or running. This information, coupled with time and date information from a clock sensor can help determine when the user is moving related to work, running in the morning or evening, or sitting at home relaxing. The various sensor information helps the system determine the environment in which the user is functioning and the state of the user—all performed dynamically without expressly asking the user to provide this information. The system responds to this information by automatically selecting sounds/visuals and lighting and temperature controls for improving the user's circumstance, by providing relaxing, motivating, energizing, on the go, etc. sounds/visuals and environment.

The received sensor information can be stored in a storage device 106, 108, or 110, along with determined sounds and visuals presented to the user for a library of data for subsequent analysis and presentation to the user. For example, the stored heartrate data can be compared to the user's current heartrate to determine whether the user's current heartrate is elevated or low. Further, past presented sounds and visuals can be labeled for subsequent presentation under similar user states if the past presented sounds and visuals were designated at being successful as, for example, providing relaxing, motivating, soothing, or energizing sounds and visuals, as determined by subsequent user comment or behavior.

At step 208, an actional description of the user is determined based on the user input, the user profile, and the sensor outputs. The user's mode, state, and/or context is determined based on analysis of the received sensor information and, alternately, information in the user's profile. As discussed above, the analyzed sensor data and profile data can determine whether the user is stressed, is relaxed, is at work, is at home, is at the gym, needs to relax, needs to focus, needs to be energized, and so on. Additionally, the user can provide input to specify her state or context, can permit the system to provide sounds/visuals appropriate to her state or context, or can expressly request the type of sounds/visuals to be presented. The state of the user relates to mental and physical condition of the user, such as stressed, relaxed, asleep, running, needing to focus, and so on. The context of the user relates to the environment of the user, such as whether the user is at work, outside, or outside; what the weather is for the user, what the date and time of day is, and what is the lighting level and the temperature of the user's environment. The combined determined mode, state, and context of the user can be referred to as the user status.

Figure 4:
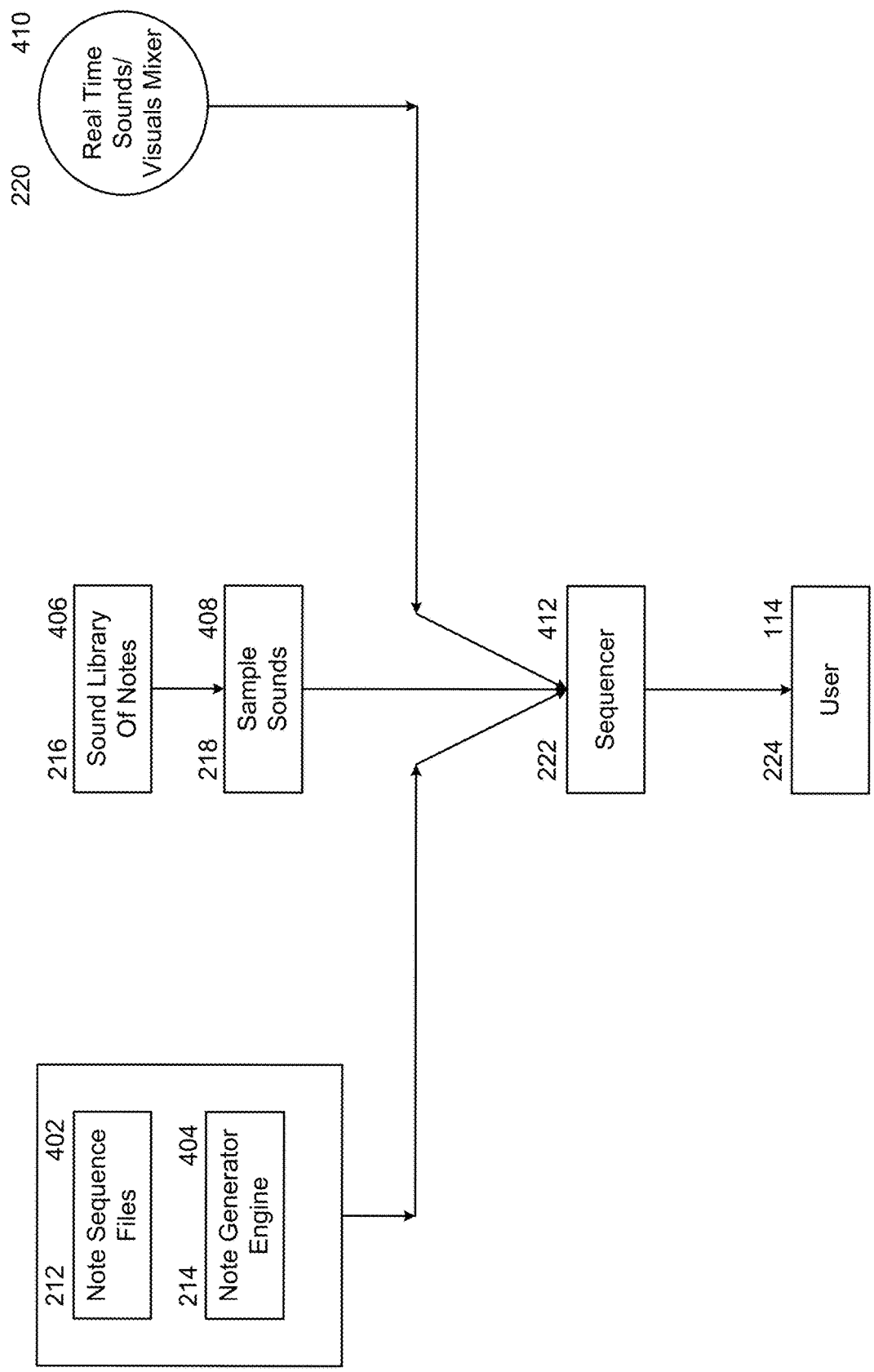
FIG. 4 is a flow diagram showing library inputs based on a determined user's state for sequencing sound and visual media for presentation to the user.
Figure 5:
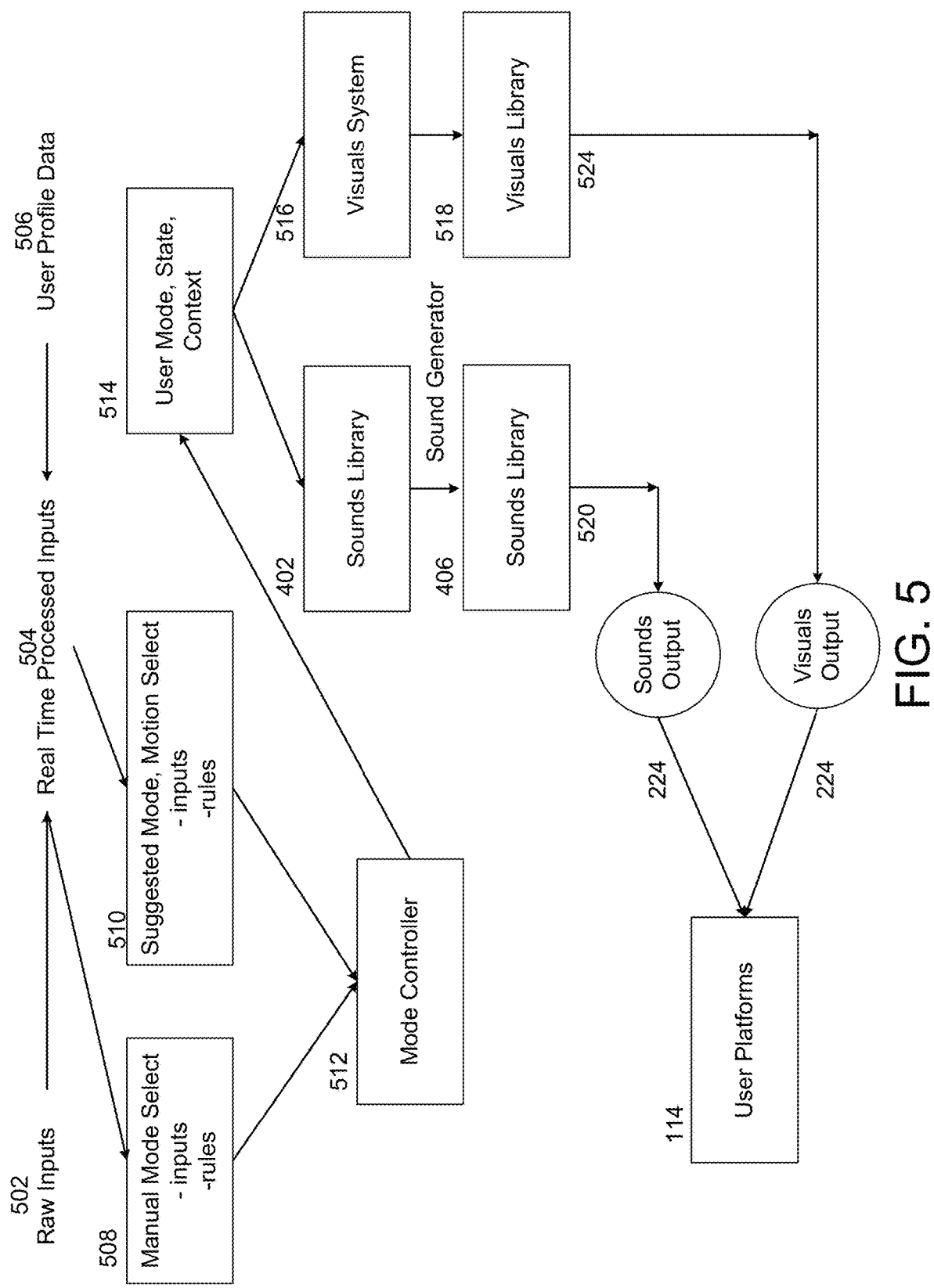
FIG. 5 shows the selection and flow of information for creating sound and visual output for presentation to the user.

At step 210, based on the user's determined or specified status, the system extracts sounds and visuals from a storage library or libraries for creating sounds and visuals for presentation to the user, based on the user's profile and specified input. Referring also to FIGS. 4 and 5, and as explained above regarding step 202, raw inputs 502 are received from the user to be processed and create a user profile 506. From the user profile, user input, and/or the sensor information, a motion and mode of the user is determined, as shown at 510-514. While not shown in FIGS. 2-5, the system also analyzes the user's status to determine whether changes should be made regarding the lighting and temperature of the user's environment and can generate and transmit control signals to effect changes in the lighting and/or temperature of the user's environment.

The system at step 212 accesses a library of note sequence files 402 divided by intensity. The note sequence files are random musical scores of note sequences, typically of 10-20 second duration that can be repeated continuously until the presentation is terminated by time, by a determined change user state or context, or by user request. The selected score(s) is selected or created by the software or firmware of the note generator engine 404, which also determines the sequence of the notes and the duration of the notes sequences, based on the determined user's state or context. As discussed above, the selection of note sequences can dynamically change as the received sensor information changes or is refreshed, reflecting changes in the user's environment, state, or context. For example, the user's heartrate or blood pressure can determine the tempo of the note sequences in the form of note beats per minute, with a slower tempo presented when the user's blood pressure is relatively high or when the user is determined to be under stress. Alternately, if the system determines, based on movement, GPS, and/or heartrate that the user is running, the system can increase the tempo of the notes presented to the user. For example, the tempo can begin at 55-70 beats per minute and increase to 100 beats per minute or more to energize the user while running or working out.

At step 214, the note generator 404 additionally determines, based on rules and past successful presentations to the user, which notes can be sequenced together or one after another. For example, notes of extremely differing pitches, tone, or sound are not sequenced together to provide relaxing or soothing sounds; whereas such contrasts can be useful to provide energizing sounds. Based on which notes are known to work together under the rules and past presentations, the sound generator 404 can create sequences of up to 40 notes which can be presented repeatedly or can be resequenced to provide a presentation variety or in response to changing sensor information.

The third source of sounds is selected at step 216 from a sound library 406 comprised of raw audio files of single notes. Again, the determined state, context, and/or user profile will determine the particular notes. For example, notes at the lower end of the musical scale can be more soothing and are selected by the system for presenting soothing or relaxing sounds. The various notes in the musical scale can be chromatically mapped to instruments sounds for having available instrument sounds for each scaled note.

A fourth source of sounds is selected at step 218 from a library of sample sounds 408, based on the determined user state, context, and/or profile. These sample sounds can include sounds from nature, white noise sounds, and sounds from musical instruments. These sounds could be up to several minutes in duration, and again are selected based on the determined state, context, and/or user profile. For example, a trumpet sound can be selected for a more energized sound for presenting to a user who is running or needs motivation. The sounds from multiple samples can be selected for presentation to a user.

Figure 6:
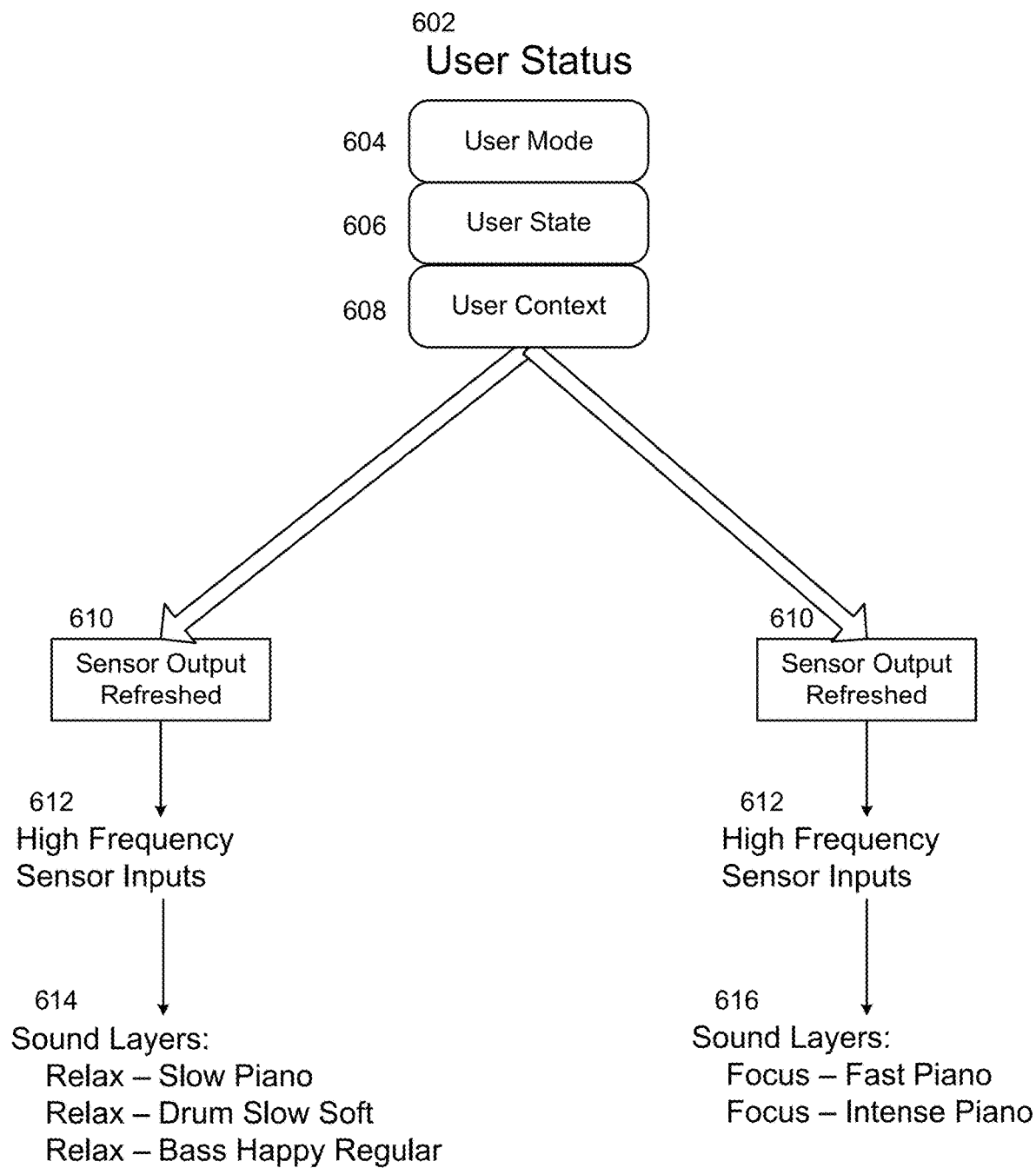
FIG. 6 shows a diagram of the sound layers that are responsive to a user's mode, state, and context.
Figure 8:
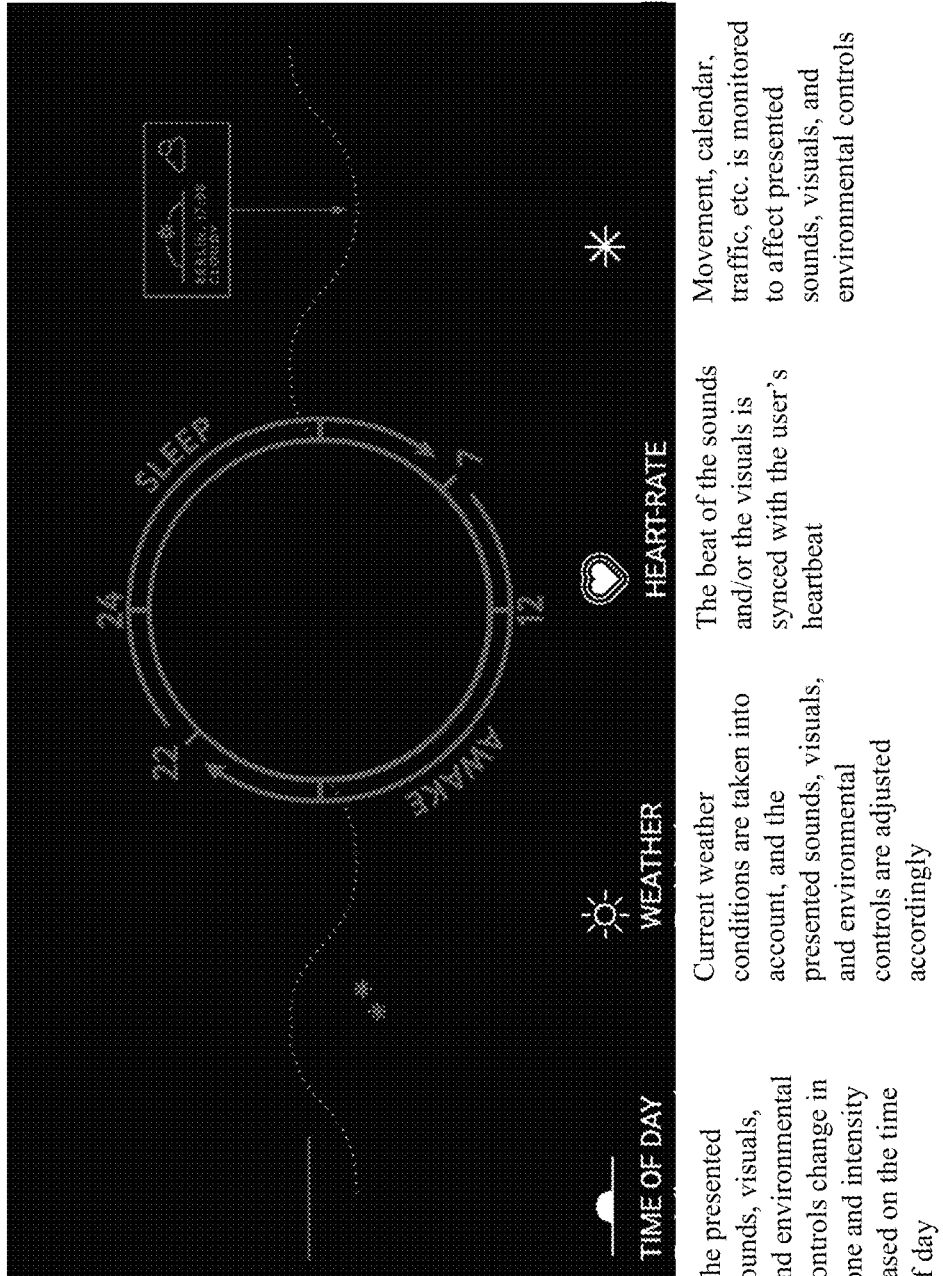
FIG. 8 shows application of circadian rhythms to sounds and visuals presented to the user based on sensor information.
Figure 9:
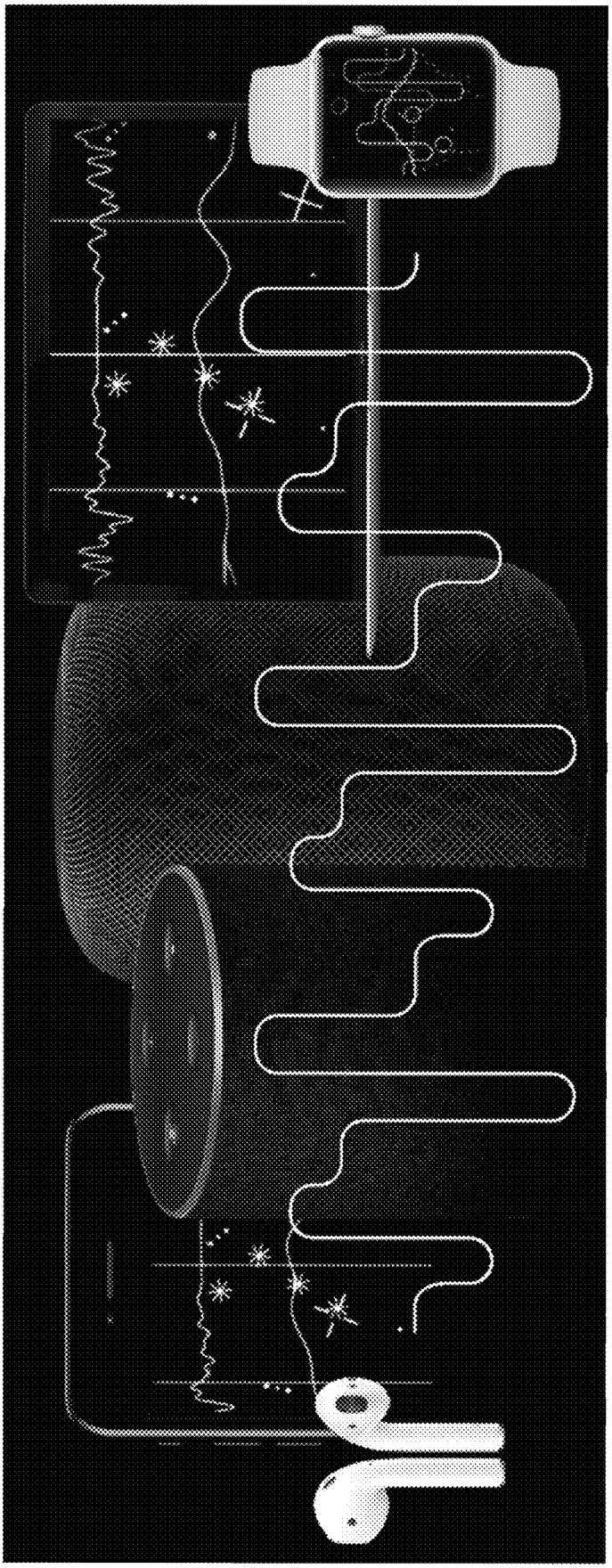
FIG. 9 shows application of the presentation of sounds and visuals on multiple user devices.
Figure 10:
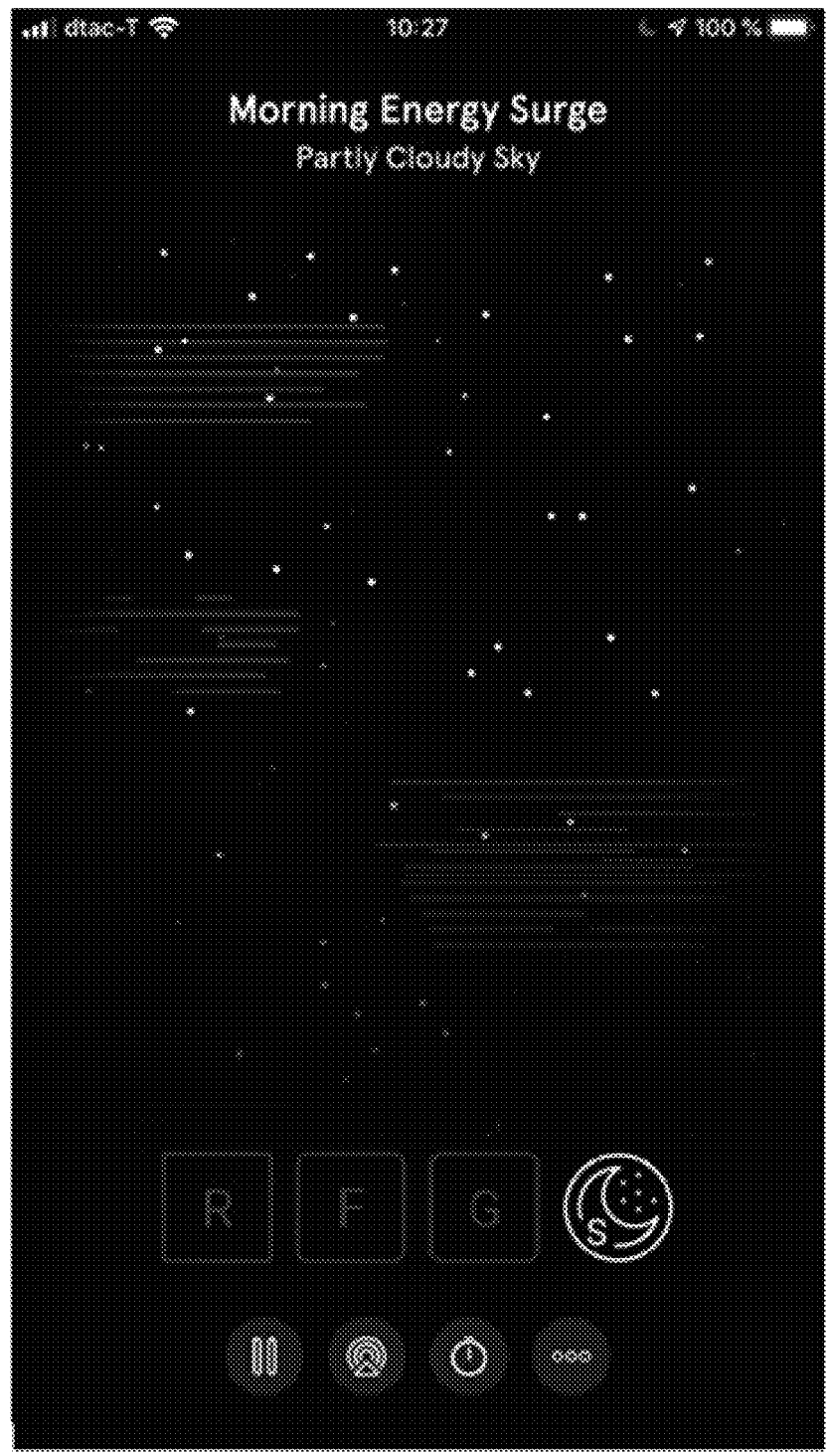
FIGS. 10-13 show exemplary visuals displays presented to the user for viewing on the user device based on sensor information.
Figure 11:
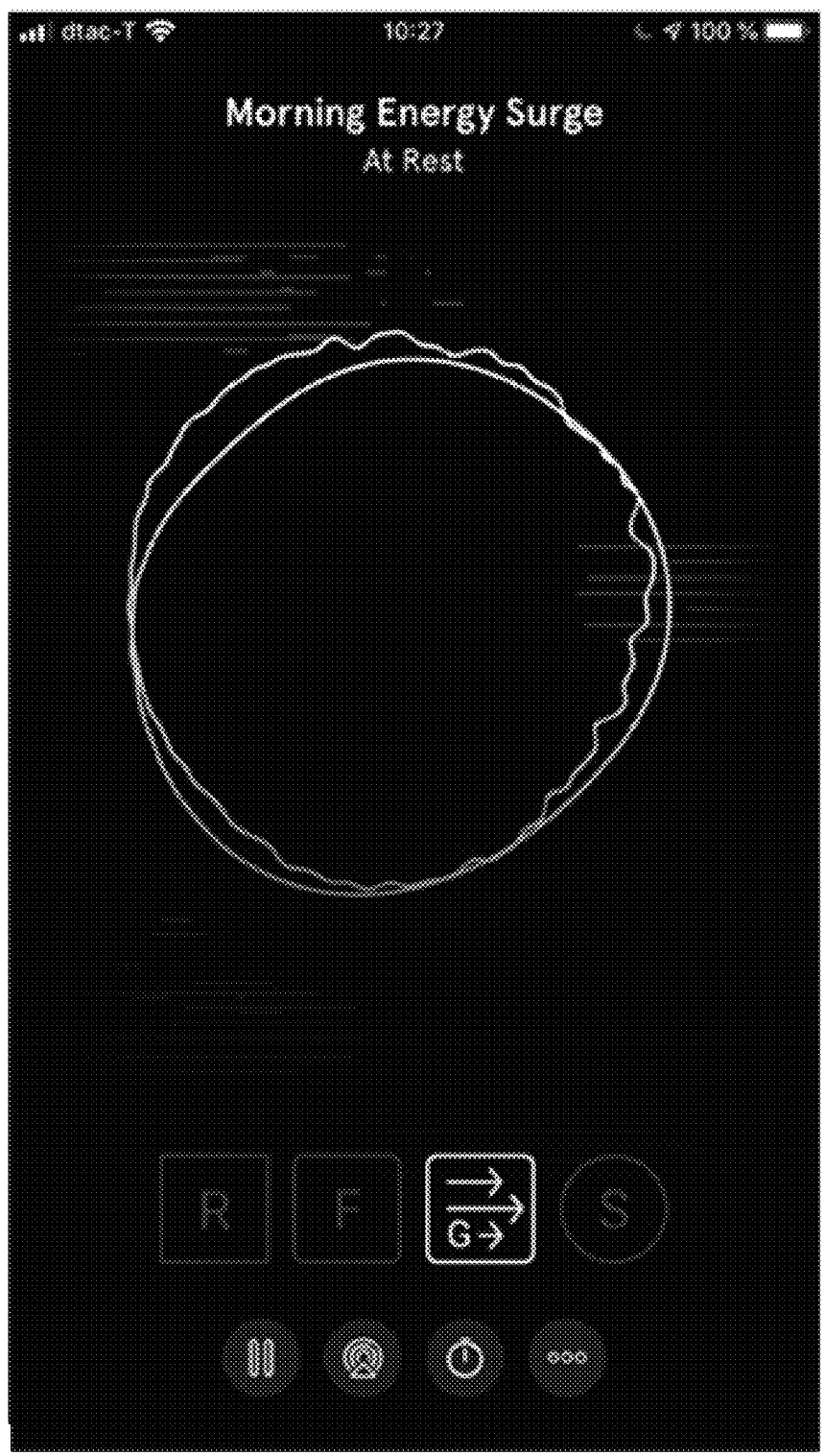
Figure 12:
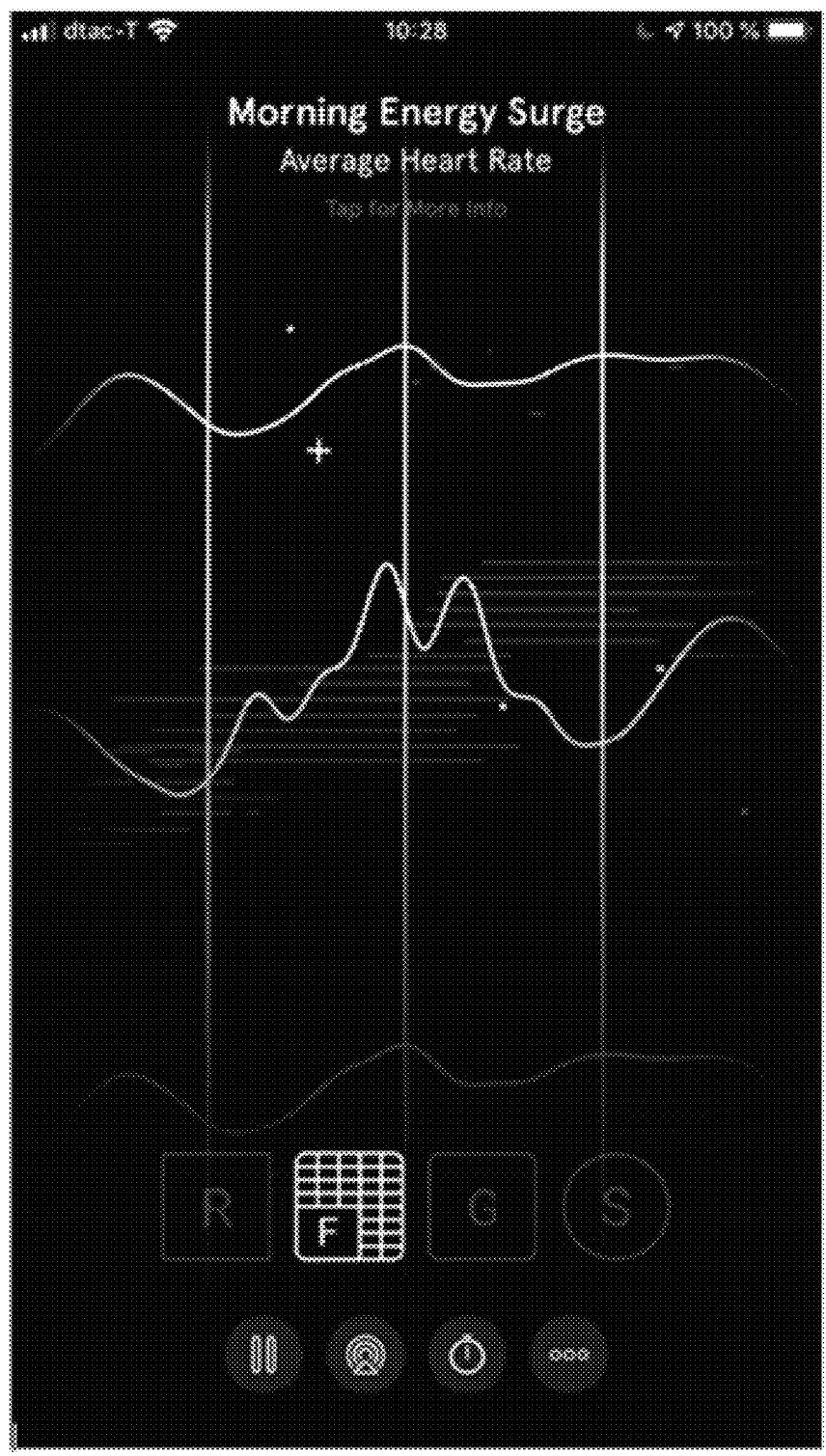
Figure 13:

Each of the note sequences and notes from steps 212-216 can be viewed as a layer of sounds, with one or more layers being presented to the user. Additional layers are available by applying the note sequences and notes from steps 212-216 to the selected instruments of step 218. At step 220, and also referring to FIGS. 6 and 7, particular sound layers 704 are selected and combined by a real time mixer 410 for presenting sounds to the user. The particular layers are selected based on a set of rules guiding the selection such that, as discussed above, the particular selected notes and instruments are appropriate for the determined user mode, state, user context, or user preferences and profile. Layers are also selected such that the layers of the combined output do not clash with each other in terms of tempo and intensity. The selected layers are sequenced together at step 222 for presentation to the user on the user device 114.

At step 224, the combined layers of sounds 520 are presented to the user for listening by the user. Visuals are created, combined, and presented to the user for viewing by the user. Lighting and/or temperature control signals are transmitted to the lighting and heating/cooling devices proximate to the user's location, either with or without the user's acknowledgement or authorization. As with the sounds, the visuals are selected from storage libraries 518 and animated and colored based on the user's state, context, and/or preferences. When both sounds 520 and visuals 524 are presented to the user, they are presented simultaneously at step 224 such that the sound notes, tempo, and intensity are consistent with and match the colors, images, speed, and animation of the visuals. FIGS. 10-13 show exemplary visuals as presented on the user's device 114. However, as discussed below, there are circumstances based on sensor information and/or user input when visuals are not transmitted to be presented to the user.

The system can also determine the volume by which the sounds are to be presented to the user. The user device 114 can include a microphone to detect a single sound, a combination of sounds, a combination of sounds and music, and a combination including human speech. For example, the microphone can be utilized to measure sound levels in the user's space and react to sudden volume changes, either raising or lowering the sounds volume to permit continued listening by the user. A detection of a new human voice can trigger a reduction in the sounds volume to permit the user to conduct a conversation without being distracted by the presented sounds.

At step 226, the system dynamically determines that information received from one or more sensors has changed and warrants a change in the sounds and/or visuals being transmitted for presentation to the user or in the controls for adjusting the lighting or temperature of the user's space. For example, the location of the user has changed, and the GPS data shows the user driving from her gym to her home. Accordingly, the system changes the sounds to be more focused and relaxed, to address the attention the user needs for traffic and for preparing for a relaxed time at home after working out. No visuals are transmitted for presentation to the user because the system recognizes the user is driving and needs to focus on traffic. Alternately, the user can specify or the system can determine the user is on a public transportation route, and receiving and viewing visuals is not a problem. Similarly, the system can determine or be instructed by the user to present only sounds at work or wherever a visual presentation would be distracting or inappropriate, such as during a meeting or while on a telephone conference. Steps 210-226 are performed automatically, without human input, based at least on the determined user state and context.

The sounds/visuals system is dynamic in that it continues to receive sensor data and user input and automatically adjusts the sounds/visuals presented to the user and control signals transmitted as the sensor data and/or user input change. The system can constantly receive output from the sensors, store the sensor output, and compare the recently received sensor output against prior stored sensor output, sensor by sensor. If the output for a particular sensor has changed significantly for that particular sensor, the system can compare the degree and direction of change against its rules and, alternately, against the user's profile and preferences. If the sensor output has changed to the extent to warrant changes to the sounds and/or visuals to be presented to the user or to the transmitted lighting or temperature control system, the system can update its output and transmit modified sounds, visuals, and/or control signals. For example, the user's heartrate increasing while the user remains stationary suggests the user is becoming more stressed, and the system automatically begins composing and presenting more relaxing sounds/visuals. Similarly, the user's GPS signals indicating the user is no longer driving and has arrived at home or at a gym suggests relaxing sounds/visuals to be presented (relaxing at home) or energizing sounds/visuals (working out at the gym). Further, lighting sensors or time of day can signal that the user could benefit increased lighting, thereby triggering the generation and transmission of a lighting control signal to increase the lighting in the user's environment.

The foregoing descriptions of specific exemplary embodiments of the present invention have been presented for purposes of illustration and description. They are not intended to be exhaustive nor to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A computer implemented method for creating a personalized environment to address an individual environment and state of a user, comprising:
   receiving output from a plurality of sensors, the sensors detecting the state of the user and the environment in which the user is active,
   wherein the received sensor output provides information on at least user location, user heartrate, user movement type, and user weather;
   determining from the sensors' output an actionable description for the user;
   determining from the determined actionable description a user mode, a user state, and a user context;
   determining from a user profile whether to present sounds, visuals, or both to the user;
   determining sounds and/or visuals to be presented to the user based on one or more of the sensor outputs, the determined actionable user description, the determined user mode, the determined user state, and the determined user context, wherein determining sounds to be presented to the user comprises:
      accessing one or more records of past successful presentations to the user of one or more note sequences, each note sequence comprising a plurality of single notes arranged in a sequence order;
      determining one or more pairs of single notes presented sequentially in one or more of the sequence orders of the records of past successful presentations; and
      dynamically generating the determined sounds to include one or more of the determined pairs of single notes;
   presenting the determined sounds and/or visuals to the user on a user device; and
   automatically modifying the determined sounds and/or visuals based on changes in the output from one or more of the plurality of sensors.

2. The method according to claim 1, further comprising:
   determining from the sensor output the lighting and temperature of the user's environment;
   determining whether to change the lighting and/or temperature of the user's environment, based on one or more of the sensor outputs, the determined actionable user description, the determined user mode, the determined user state, and the determined user context;
   upon determining that the lighting and/or temperature of the user's environment should be changed:
      generating control signals to change the lighting and/or temperature of the user's environment; and
      transmitting the generated control signals to the lighting, heating, and/or cooling devices for changing the lighting and temperature of the user's environment.

3. The method according to claim 2, wherein modifying the determined sounds and/or visuals further comprises:
   comparing the sensor output against previously received sensor output to determine whether the sensor output has changed;
   upon determining that the sensor output has changed, determining whether the sensor output has changed to the extent to warrant changes to the sounds and/or visuals to be presented to the user or to the transmitted lighting or temperature control signals;
   upon determining changes to the sounds and/or visuals are warranted:

determining from the changed sensor output an updated actionable description for the user;
determining from the determined updated actionable description a user mode, a user state, and a user context;
determining from the user profile whether to present sounds, visuals, or both to the user;
determining updated sounds and/or visuals to be presented to the user based on one or more of the sensor outputs, the determined updated actionable user description, the determined user mode, the determined user state, and the determined user context;
presenting the determined updated sounds and/or visuals to the user on the user device;
upon determining changes to the transmitted control signals are warranted:
generating updated control signals to change the lighting and/or temperature of the user's environment; and
transmitting the generated updated control signals to the lighting, heating, and/or cooling devices for changing the lighting and temperature of the user's environment.

4. The method according to claim 1, further comprising:
receiving sound and/or visuals preferences from the user; and
automatically modifying the determined sounds and/or visuals based on changes in the received sound and/or visuals preferences received from the user.

5. The method according to claim 1, further comprising determining a sound volume for the determined sounds.

6. The method according to claim 1, wherein the determined actionable description includes a user mode, a user state, a user context, and a user physical environment.

7. The method according to claim 1, wherein the plurality of sensors comprises one or more of:
a clock;
a calendar;
a thermometer;
a pedometer;
a barometer;
a rain sensor;
a wind sensor;
a heart rate monitor;
a blood pressure monitor;
a microphone; and
a spatial sensor.

8. The method according to claim 1, wherein the received output is derived from a list comprising:
time;
date;
heartrate;
blood pressure;
weather;
user location; and
movement type/speed.

9. The method according to claim 1, wherein the plurality of single notes comprising a given note sequence are selected based on one or more of pitch, tone, a location within a musical scale, and a set of different available instrument sounds for a given single note.

10. A system for creating a personalized environment to address an individual environment and state of a user, comprising:
a network sounds/visuals server;
a computer readable medium; and
a processor coupled to the computer readable medium, wherein the processor is operative to:
receive output from a plurality of sensors, the sensors detecting the state of the user and the environment in which the user is active,
wherein the received sensor output provides information on at least user location, user heartrate, user movement type, and user weather;
determine from the sensors' output an actionable description for the user;
determine from the determined actionable description a user mode, a user state, and a user context;
determine from a user profile whether to present sounds, visuals, or both to the user;
determine sounds and/or visuals to be presented to the user based on one or more of the sensor outputs, the determined actionable user description, the determined user mode, the determined user state, and the determined user context, wherein the processor is operative to determine sounds to be presented to the user by:
accessing one or more records of past successful presentations to the user of one or more note sequences, each note sequence comprising a plurality of single notes arranged in a sequence order;
determining one or more pairs of single notes presented sequentially in one or more of the sequence orders of the records of past successful presentations; and
dynamically generating the determined sounds to include one or more of the determined pairs of single notes;
present the determined sounds and/or visuals to the user on a user device; and
automatically modify the determined sounds and/or visuals based on changes in the output from one or more of the plurality of sensors.

11. The system according to claim 10, wherein the processor is further operative to:
determine from the sensor output the lighting and temperature of the user's environment;
determine whether to change the lighting and/or temperature of the user's environment, based on one or more of the sensor outputs, the determined actionable user description, the determined user mode, the determined user state, and the determined user context;
upon determining that the lighting and/or temperature of the user's environment should be changed:
generate control signals to change the lighting and/or temperature of the user's environment; and
transmit the generated control signals to the lighting, heating, and/or cooling devices for changing the lighting and temperature of the user's environment.

12. The system according to claim 11, wherein the processor being operative to modify the determined sounds and/or visuals is further operative to:
compare the sensor output against previously received sensor output to determine whether the sensor output has changed;
upon determining that the sensor output has changed, determine whether the sensor output has changed to the extent to warrant changes to the sounds and/or visuals to be presented to the user or to the transmitted lighting or temperature control signals;
upon determining changes to the sounds and/or visuals are warranted:
determine from the changed sensor output an updated actionable description for the user;

determine from the determined updated actionable description a user mode, a user state, and a user context;

determine from the user profile whether to present sounds, visuals, or both to the user;

determine updated sounds and/or visuals to be presented to the user based on one or more of the sensor outputs, the determined updated actionable user description, the determined user mode, the determined user state, and the determined user context;

present the determined updated sounds and/or visuals to the user on the user device;

upon determining changes to the transmitted control signals are warranted:

generate updated control signals to change the lighting and/temperature of the user's environment; and transmit the generated updated control signals to the lighting, heating, and/or cooling devices for changing the lighting and temperature of the user's environment.

13. The system according to claim 10, wherein the processor is further operative to:

receive sound and/or visuals preferences from the user; and automatically modify the determined sounds and/or visuals based on changes in the received sound and/or visuals preferences received from the user.

14. The system according to claim 10, wherein the processor is further operative to determine a sound volume for the determined sounds.

15. The system according to claim 10, wherein the determined actionable description includes a user mode, a user state, a user context, and a user physical environment.

16. A computer readable medium, not including a signal, having computer readable instructions stored thereon which, when executed by a processor, provide for creating a personalized environment to address an individual environment and state of a user, the instructions executing on a processor of a computer, comprising the steps of:

receiving output from a plurality of sensors, the sensors detecting the state of the user and the environment in which the user is active, wherein the received sensor output provides information on at least user location, user heartrate, user movement type, and user weather;

determining from the sensors' output an actionable description for the user;

determining from the determined actionable description a user mode, a user state, and a user context;

determining from a user profile whether to present sounds, visuals, or both to the user;

determining sounds and/or visuals to be presented to the user based on one or more of the sensor outputs, the determined actionable user description, the determined user mode, the determined user state, and the determined user context, wherein determining sounds to be presented to the user comprises:

accessing one or more records of past successful presentations to the user of one or more note sequences, each note sequence comprising a plurality of single notes arranged in a sequence order;

determining one or more pairs of single notes presented sequentially in one or more of the sequence orders of the records of past successful presentations; and dynamically generating the determined sounds to include one or more of the determined pairs of single notes;

presenting the determined sounds and/or visuals to the user on a user device; and automatically modifying the determined sounds and/or visuals based on changes in the output from one or more of the plurality of sensors.

17. The computer readable medium according to claim 16, further comprising:

determining from the sensor output the lighting and temperature of the user's environment;

determining whether to change the lighting and/or temperature of the user's environment, based on one or more of the sensor outputs, the determined actionable user description, the determined user mode, the determined user state, and the determined user context;

upon determining that the lighting and/or temperature of the user's environment should be changed:

generating control signals to change the lighting and/temperature of the user's environment; and transmitting the generated control signals to the lighting, heating, and/or cooling devices for changing the lighting and temperature of the user's environment.

18. The computer readable medium according to claim 17, wherein modifying the determined sounds and/or visuals further comprises:

comparing the sensor output against previously received sensor output to determine whether the sensor output has changed;

upon determining that the sensor output has changed, determining whether the sensor output has changed to the extent to warrant changes to the sounds and/or visuals to be presented to the user or to the transmitted lighting or temperature control signals;

upon determining changes to the sounds and/or visuals are warranted:

determining from the changed sensor output an updated actionable description for the user;

determining from the determined updated actionable description a user mode, a user state, and a user context;

determining from the user profile whether to present sounds, visuals, or both to the user;

determining updated sounds and/or visuals to be presented to the user based on one or more of the sensor outputs, the determined updated actionable user description, the determined user mode, the determined user state, and the determined user context;

presenting the determined updated sounds and/or visuals to the user on the user device;

upon determining changes to the transmitted control signals are warranted:

generating updated control signals to change the lighting and/temperature of the user's environment; and transmitting the generated updated control signals to the lighting, heating, and/or cooling devices for changing the lighting and temperature of the user's environment.

19. The computer readable medium according to claim 16, further comprising:

receiving sound and/or visuals preferences from the user; and automatically modifying the determined sounds and/or visuals based on changes in the received user's sound and/or visuals preferences received from the user.

20. The computer readable medium according to claim 16, wherein the determined actionable description includes a user mode, a user state, a user context, and a user physical environment.

* * * * *